US008336051B2

(12) United States Patent
Gokulakannan

(10) Patent No.: US 8,336,051 B2
(45) Date of Patent: Dec. 18, 2012

(54) SYSTEMS AND METHODS FOR GROUPED REQUEST EXECUTION

(75) Inventor: Kodumudi Somasundaram Gokulakannan, Broadview Heights, OH (US)

(73) Assignee: Electron Database Corporation, Independence, OH (US)

( * ) Notice: Subject to any disclaimer, the term of this patent is extended or adjusted under 35 U.S.C. 154(b) by 124 days.

(21) Appl. No.: 12/939,566

(22) Filed: Nov. 4, 2010

(65) Prior Publication Data

US 2012/0117075 A1 May 10, 2012

(51) Int. Cl.
*G06F 9/46* (2006.01)
(52) U.S. Cl. ........ 718/101; 718/102; 707/704; 707/812; 709/201
(58) Field of Classification Search .................. None
See application file for complete search history.

(56) References Cited

U.S. PATENT DOCUMENTS

| | | | | |
|---|---|---|---|---|
| 6,898,607 B2* | 5/2005 | Rising et al. ........................ 1/1 |
| 7,174,331 B1 | 2/2007 | Luo et al. |
| 7,280,536 B2* | 10/2007 | Testardi ........................ 370/355 |
| 7,406,486 B1* | 7/2008 | Kundu et al. ........................ 1/1 |
| 7,814,080 B1* | 10/2010 | Luo et al. ........................ 707/703 |
| 7,841,080 B2 | 11/2010 | Luo et al. |
| 8,032,885 B2* | 10/2011 | Fish .............................. 718/101 |
| 2005/0004996 A1* | 1/2005 | Nagai et al. ........................ 709/219 |
| 2005/0114508 A1 | 5/2005 | DeStefano |
| 2006/0287939 A1* | 12/2006 | Harel et al. ........................ 705/37 |
| 2008/0276239 A1* | 11/2008 | Collins et al. ........................ 718/101 |
| 2009/0013323 A1* | 1/2009 | May et al. ........................ 718/104 |
| 2010/0199033 A1* | 8/2010 | Nguyen et al. ........................ 711/104 |
| 2010/0250809 A1 | 9/2010 | Ramesh et al. |
| 2011/0173619 A1* | 7/2011 | Fish .............................. 718/101 |
| 2012/0005330 A1* | 1/2012 | Moran et al. ........................ 709/224 |

OTHER PUBLICATIONS

Li Wen, "B+ Tree", 2003.*
Erika Fuentes, "Concurrency Throttling Concurrency in the CLR 4.0 ThreadPool", Sep. 2010.*
Lin et al, "Analysis of Optimal Thread Pool Size", Feb. 2000.*
"Provide concurrent VSAM access between batch and CICS", H&W Bridging the Enterprise Computing Gap, 2004.*
International Search Report and Written Opinion for PCT/US11/23279 dated Mar. 25, 2011 (13 pages).
Harizopoulos et al., "QPipe: a simultaneously pipelined relational query engine," Proceedings of the 2005 ACM SIGMOD International Conference on Management of Data, [Online] Jun. 14, 2005-Jun. 16, 2005, pp. 383-394, XP002591744.

(Continued)

*Primary Examiner* — Hung Le
(74) *Attorney, Agent, or Firm* — Calfee, Halter & Griswold LLP

(57) ABSTRACT

A server architecture performs concurrent information processing in a server system on a multi-core processor environment. The architecture supports simultaneous processing requests comprising multiple classes of queries and/or executing transactions in an application server and/or database server. Requests, which are made in an asynchronous manner, are structured with hash values to enable similar requests to be grouped together. The similar requests are grouped into a group session. All of the requests in the group session are executed at the same time. Accordingly, similar database inserts can be grouped and executed as a single request. The architecture minimizes thread-switching overhead by exploiting inherent parallelism in the inflowing requests. The threads and requests are de-coupled and hence any lock request only makes the execution threads take up another request instead of waiting until the lock is acquired. As such, the threads never go into sleep/wait mode and system resources are utilized more efficiently.

24 Claims, 10 Drawing Sheets

OTHER PUBLICATIONS

Harizopoulos et al., "A case for staged database systems," Proceedings of 1st Conference on Innovative Data System Research, [Online] 2003, ZP002591745.

Menendez, "Staged server design," [Online] 2005, pp. 1-10, XP002591746.

Larus et al., "Using cohort scheduling to enhance server performance," Internet Article [Online} Jun. 2006, pp. 1-12, XP002591781.

International Search Report and Written Opinion for PCT/SG201000149 dated Sep. 7, 2010 (15 pages).

\* cited by examiner

SYSTEMS AND METHODS FOR GROUPED REQUEST EXECUTION

RELATED APPLICATION

The present application is related to International Application PCT/SG2010/000149 filed on Apr. 14, 2010 which claims priority from Singapore Patent Application No. 200902512-3 filed on Apr. 14, 2009, and both of these applications are incorporated herein by reference in their entirety.

FIELD

The general inventive concepts relate to and contemplate systems and methods for implementing a software processing architecture and, more specifically, to systems and methods for implementing a software processing architecture that supports grouped execution of requests.

BACKGROUND

Current server software architectures fall into one of two categories relative to their efforts to improve on performance and scalability. In particular, existing database applications in the market, such as Oracle, SQL Server, DB2, PostgreSQL (object RDBMS), MySQL (RDBMS) and Firebird (database server), employ one of the following two architectures: (a) an architecture using a process or thread per user session (hereinafter "process/thread per session architecture"); and (b) an architecture using a process pool or thread pool for handling all of the user sessions (hereinafter "process/thread pool architecture").

The process/thread per session architecture, wherein a process or thread is utilized per user session, is more commonly used in database systems. A schematic block diagram of a model 100 of this conventional architecture is shown in FIG. 1. According to the process/thread per session architecture, a process or thread is spawned each time any user logs in and lasts until the user has logged out. All requests from the user are undertaken in the spawned process or thread. The process/thread per session architecture has various limitations, drawbacks, and/or disadvantages.

For example, in the process/thread per session architecture, process creation is costly and is not resource-efficient, especially in online transaction processing (OLTP) systems. When a number of users are logged in, the system would be running a corresponding number of processes and hence a large amount process switching overhead is required by system resources compared to that actually employed to perform useful work during times of normal or average usage.

To ameliorate these limitations, a connection pool is typically provided at the application server level, i.e., a cache of database connections is maintained by the database so that the connections can be reused when the system needs to attend to future requests for data. With this technique, a user's OLTP need not be executed by the same process or thread every time but the result is that data cannot be cached in memory at the database level between two requests in a particular session. The data can still be cached in a memory area, accessible to all the sessions, but then it introduces synchronization overheads to access/modify the data. As an example, if the user keeps sending the same query repeatedly, it might be reasonable for the system to store the query plan and any relevant data in that user's own session memory, which can be accessed without any synchronization. However, such memory area (unique to a session) is not available at the database server level, since each request might go to a different process or thread.

A server architecture might be designed such that data is stored at the application server level memory, but this could result in too much caching at the application server level and thus in a considerable garbage collection overhead. One conventional method for avoiding heap management or garbage collection overhead is by pre-allocating pools of memory and using a custom, lightweight scheme for allocation/de-allocation. However efficient the garbage collection algorithm is, it is designed only for short-lived small objects and not for persistent information or long-lived caches. Because application server garbage collection is designed with short lived objects in mind, if such a heap is being used as a cache for database connections, then the overhead will be considerable. Moreover, some of the data-like query plans are known to be very complex to be cached at the application server level. These query plans are also known as "query execution plans," i.e., a set of steps used to access or modify information in an SQL RDBMS. The plan basically indicates whether to do an index scan or a full table scan to get the query results.

Another disadvantage of the connection pool at the application server end is that the full utility of temporary tables cannot be exploited. Any insert/update in the database will result in recovery log overhead. This overhead is incurred to safeguard data integrity so that when the database crashes, the data can be recovered. However, for temporary cached data as discussed above, logging for crash recovery is not required and it is not necessary to provide for the typical robust log file structure to redundantly record the database update operation. In fact, ISO standards approve a less robust temporary table structure which need not be recovered after a database crash. Nevertheless, the temporary table will become tied to the database server process in this case and the connection pool does not guarantee allocation of the requests from the same user to the same database server process or thread. Hence, any temporary table activity is restricted to use within a request and cannot be spawned across requests.

Additionally, it is difficult to correlate actual system resources to the process/thread per session architecture. As every user login creates a process or thread, the number of execution units is not under the control of the database architecture and hence might result in inefficient utilization of the system resources in delivering the optimal output. One might try to estimate the number of concurrent users in order to produce a well-balanced system, but accurate estimation of concurrency depends heavily on heuristics and user behaviors which often vary from time to time.

The process/thread pool architecture, wherein a process pool or thread pool handles all user sessions, will now be discussed. A schematic block diagram of a model 200 of such an architecture is shown in FIG. 2. The process/thread pool architecture is based on the Half-Sync/Half-Async design pattern which is commonly implemented in application servers and supported in some database servers. According to the process/thread pool architecture, a pool of processes or threads takes requests from a queue one by one and executes each of them to completion. The process/thread pool architecture might also need a pool of processes or threads to communicate with the clients. The process/thread pool architecture has various limitations, drawbacks, and/or disadvantages.

For example, if there are a few long-running queries, the queries will occupy the processes or threads for a long time making them unavailable for smaller queries. Moreover, if the process pool or thread pool was created with a predetermined maximum number of processing units in mind, then the processing units may be under-utilized during the I/O service time of the requests. This disadvantage is especially true for a database server architecture where a lot of I/O is involved.

It is also difficult to build in an option to increase the hit ratio on the data cache and instruction cache whenever such opportunity presents itself in the process/thread pool architecture. Furthermore, the concurrency requirement in the process/thread pool architecture is usually handled in the same way as in the previously discussed process/thread per session architecture. Thus, there is a chance that all the shared servers might be waiting to acquire a lock or enter a monitor such that the overall system resources are under-utilized.

Another disadvantage of both the process/thread per session architecture and the process/thread pool architecture, which handle concurrent requests from different user sessions, is that such requests are executed separately.

In the context of a database server 300, as shown in FIG. 3, concurrent requests 302 from different user sessions are processed. For example, the concurrent requests 302 are n requests including a first request 304, a second request 306, a third request 308, a fourth request 310, and so on up to the nth request 312. Each of the n requests 302 involve inserting a record into the database. As noted above, in conventional architectures, the requests 302 are individually executed by the database server 300.

Thus, for each of the requests 302, the database server 300 must (i) find free storage (e.g., disk) space for the record to be inserted and (ii) write the record into the storage space. Steps (i) and (ii) are well known in the art. The database server 300 might also need to (iii) obtain a sequence value to be used to identify the inserted record within an index and (iv) enter the sequence value in the index. In step (iii), the sequence value is typically obtained from a counter that generates values based on an initial value and an offset value. For example, a counter with an initial value of 100 and an offset value of 2 will return the sequence values 100, 102, 104, 106, etc. As requests for sequence values may be processed concurrently by the counter, step (iii) typically involves a compare-and-swap (CAS) or similar instruction to insure that the sequence values are calculated based on up-to-date information.

B+ Tree indexes on such obtained sequence values are common as these values usually constitute the primary keys of a database table. For example, in an order processing system an "OrderId" field of a table stores sequence values representing unique order numbers. An index (e.g., in the form of a B+ Tree) is created (and updated via step (iv)) on the order numbers to facilitate searching the table. Suppose n orders originate at the same time for the order processing system, then there will be n index entries for the orders, each index entry being an order number and pointing to a corresponding record in the table. FIG. 4 is a diagram illustrating the structure of a B+ Tree index 400 according to a conventional server software architecture.

The database server 300 would need to separately perform the 4 steps or operations (i.e., steps (i), (ii), (iii), and (iv)) for each of the n requests 302. So, in the case of 10 concurrent requests, 40 separate operations would be required.

In general, as shown in FIG. 3, for the n requests 302, 4 times n separate operations are required (or 2 times n if the sequence values are not obtained and maintained in an index). For the first request 304, an operation 314 to find free space for the record to be inserted is performed, an operation 316 to write the record into the free space is performed, an operation 318 to obtain a sequence value is performed, and an operation 320 to update an index (e.g., the index 400) with the sequence value is performed. For the second request 306, an operation 322 to find free space for the record to be inserted is performed, an operation 324 to write the record into the free space is performed, an operation 326 to obtain a sequence value is performed, and an operation 328 to update the index with the sequence value is performed. For the third request 308, an operation 330 to find free space for the record to be inserted is performed, an operation 332 to write the record into the free space is performed, an operation 334 to obtain a sequence value is performed, and an operation 336 to update the index with the sequence value is performed. For the fourth request 310, an operation 338 to find free space for the record to be inserted is performed, an operation 340 to write the record into the free space is performed, an operation 342 to obtain a sequence value is performed, and an operation 344 to update the index with the sequence value is performed. Likewise, for the nth request 312, an operation 346 to find free space for the record to be inserted is performed, an operation 348 to write the record into the free space is performed, an operation 350 to obtain a sequence value is performed, and an operation 352 to update the index with the sequence value is performed.

There is often considerable similarity between requests that arrive concurrently (e.g., the requests 302). However, neither the process/thread per session architecture nor the process/thread pool architecture efficiently exploits this similarity.

SUMMARY

The general inventive concepts contemplate systems and methods for implementing a software processing architecture.

The general inventive concepts contemplate systems and methods for implementing a software processing architecture for an application server or database server running on multi-core or multi-processor machines with cache-coherent non-uniform memory access (cc-NUMA) and symmetric multi-processing (SMP) architectures, particularly favoring the former.

The general inventive concepts contemplate systems and methods for processing, threading and locking in server software to handle concurrent requests such that performance and scalability are improved.

The general inventive concepts contemplate systems and methods for implementing a software processing architecture that supports decomposing requests into multiple sync-points.

The general inventive concepts contemplate systems and methods for implementing a software processing architecture that supports grouping of concurrent requests or portions thereof.

The general inventive concepts contemplate systems and methods for implementing a software processing architecture that supports execution of grouped requests or portions thereof.

The general inventive concepts contemplate systems and methods for the grouped execution of database insert operations.

An improved architecture for handling concurrent requests, according to one exemplary embodiment, is a variation of the process/thread pool architecture discussed above. The architecture groups similar requests and then executes them together. For example, consider a full table scan request wherein there are two queries:

Query 1: Select * from employees_table where name like 'a %'.

Query 2: Select * from employees_table where name like 'b %'.

Both of these queries have operations in common, i.e., fetching the record and obtaining the value of the name field out of it. Only the condition to be applied differs among the queries. Conventional architectures run these two requests as separate requests.

In one exemplary embodiment of the architecture of the present invention, these requests are grouped into a single request that will do the task of fetching the records and fetching the name field out of them only once, after which it will try to segregate the requests based on their respective query criteria and forward to the appropriate client (from whence the query originated).

In one exemplary embodiment of the architecture of the present invention, the architecture does not merely execute an entire request at a time but instead splits a request into multiple sync-points (Syncpoint A, Syncpoint B, etc.). This is done because there might be more grouping opportunities between any two sync-points. For example, multiple requests might have the same operation between Syncpoint A and Syncpoint B and hence that operation can be performed only once amongst all the requests.

In one exemplary embodiment of the architecture of the present invention, a cache-conscious and multi-core-conscious server architecture exploits concurrency in handling similar requests. As a result, thread-switching overhead is minimized by exploiting inherent parallelism in the inflowing requests. As noted above, this is achieved by grouping together requests that have similar tasks and executing them only once. The grouping is facilitated by integrating a value to the set of information or query structure of the request in a substantially asynchronous manner. In one exemplary embodiment, the requests are processed in a fully asynchronous manner. The integrated values can be used to determine if requests have tasks in common with one another. In this manner, concurrent requests having common tasks can be grouped together for single execution.

In one exemplary embodiment of the architecture of the present invention, threads and requests are totally de-coupled from each other such that any lock request only makes the execution thread queue the locking request (if the lock cannot be obtained immediately), which allows the execution thread to take up another request instead of waiting until the lock is acquired. Accordingly, threads inside the database process never go into a sleeping/waiting mode and system resources are utilized more efficiently.

By minimizing the locks required, processing or threading of server requests across multiple classes of requests is enhanced. This is achieved by switching the requests to the threads holding the shared data and enabling the current threads to continue processing another request. For example, if Request_r1 in Thread A wants to read a page, being held by Thread B, Thread A simply queues the request under Thread B and proceeds on to executing some other request in its queue.

Since the request being executed is split into multiple sync-points and a request can only be associated with a thread between two sync-points, the case of one request hogging or otherwise occupying a thread for an extended period of time is reduced if not eliminated. The request can even get disconnected with the thread between two sync-points, such as when there is a lock/page request which is not available to be acquired. In this case, the request gets transferred to the thread owning the lock/page.

The general inventive concepts encompass methods for concurrent information processing in a server system on a multi-core processor caching environment that includes simultaneously processing requests comprising multiple classes of queries and/or executing transactions in at least one of an application server and a database server. One exemplary method comprises: (a) making the requests in a substantially asynchronous manner (e.g., in a fully asynchronous manner); (b) maintaining the structure of the requests with information that enables similar requests to be grouped together; (c) grouping the similar requests in a group session; and (d) executing the requests in the group session.

This group session is therefore relatively short lived since it exists only for execution of the common tasks and delivering the results to the respective user sessions. In one exemplary embodiment, the information or query structure of the requests is maintained such that a plurality of concurrent requests is identifiable by their respective tasks and grouped according to their similarity of task category. In one exemplary embodiment, the information or query structure of the requests is assigned a similar hash value according to the similar task category of the request. Upon being grouped according to similarity of tasks, the grouped requests may be executed as a single request. The grouped requests may further be maintained as a grouping session for execution in a database server or application server.

In one exemplary embodiment of the architecture of the present invention, a request is switchable between threads based on the current holder of the shared data required by the request. In one exemplary embodiment of the new architecture, the information or query structure of the requests is managed on the basis of thread-specific storage structures providing concurrent access to shared data among concurrent data updates.

In one exemplary embodiment of the architecture of the present invention, concurrent information processing involves processing in a fully asynchronous manner, including enabling the requests to pause and restart on demand. In one exemplary embodiment of the architecture of the present invention, a request is divided into multiple sync-points and the request is coupled to the thread only between two sync-points. Even between two sync-points, the request might get de-coupled from the thread executing it, as in the case of a page request/lock request.

In one exemplary embodiment of the architecture of the present invention, incoming requests are handled by Request Handlers and a separate class of threads embodied as I/O Handlers, taking care of both the network and/or disk I/O. In one exemplary embodiment, one I/O Handler runs for each Request Handler and for flushing data as required for secondary storage. In one exemplary embodiment of the architecture of the present invention, a new request object is created for the Request Handler to process the grouped requests as a single request. The Request Handler need not wait on any I/O operations, hence the processing power is efficiently utilized.

In one exemplary embodiment of the architecture of the present invention, a plurality of sync-points for each of the requests in a group are provided prior to their completion. In one exemplary embodiment, all the requests in the group are taken to a particular synchronization point before proceeding therefrom and carrying forward all of the requests to a next synchronization point.

In one exemplary embodiment of the architecture of the present invention, each processor is bound to a thread group with each core hosting two threads: a thread for each of the Request and I/O Handlers. In one exemplary embodiment, each thread group operates on a subset of tables depending on the workload on the database and only joins access data from other tables.

In the event a locking request is made, an execution thread will put up the locking request for queuing without waiting for the lock to be acquired and then will take up another request to be processed. The request from the first thread may be switched to a second thread holding needed shared data, thus enabling the first thread to continue processing another request.

When a first thread in possession of its own operating page receives a request to operate on the operating page from a second thread, the request may be enqueued in the first thread's operating page queue. In one exemplary embodiment, multiple requests from second and subsequent threads are processed in the same manner with each of the multiple requests being so enqueued in the first thread's operating page queue, favorably in the same core.

In one exemplary embodiment of the architecture of the present invention, when a thread or Request Handler takes a lock on an operating page and the requests enqueued on the page, the thread groups the enqueued requests according to similarity of tasks, when possible and/or practical, for group execution. In one exemplary embodiment, the grouped requests are executed as a single request or a series of requests in a Grouped Executor Session.

One exemplary method comprises: (i) a first Request Handler taking a request from a Request Handler Group Queue to examine it with a view to executing the request; (ii) if the request's execution requires access to data or information that is on a particular page of a table, the header of that page is first examined; (iii) if the particular page is already in possession of a second Request Handler, then the request is queued under one of the queues of the second Request Handler; (iv) if the page is marked as the operating page, then the request is queued under the operating page queue of the second Request Handler, otherwise the request is queued under the other page request queue; and (v) the first Request Handler continues processing by taking a new request to be examined with a view to execute it.

One or more of the aforementioned features may be particularly beneficial within a cc-NUMA architecture system, since the more relevant data will likely be loaded into the local memory and not the remote memory, thereby increasing the speed of memory access. However, for SMP systems, there will only be one thread group and that thread group will have access to all the tables such that there is no special advantage gained.

As noted above, the general inventive concepts contemplate systems and methods for implementing a software processing architecture that supports execution of grouped database insert commands.

However, in some instances, such grouped execution of database insert commands does not yield sufficient gains (e.g., improvements in efficiency) so as to be warranted. Thus, when the costs of grouping do not outweigh any gains therefrom, there is no use in performing the grouping and subsequent grouped execution. For example, one scenario in which grouped execution is not performed is for a normal index scan which walks down a B+ Tree index, unless the values being searched are very close to one another and are likely to be placed in the same leaf page.

Accordingly, in one exemplary embodiment of the architecture of the present invention, the requests are first evaluated to determine if grouped execution thereof is warranted before any grouping occurs. If it is determined that the costs of performing the grouped execution of the database insert commands are outweighed by the likely gains resulting therefrom, then grouped execution occurs and overall efficiency is expected to increase.

For example, after calculating the needed free space for an insert operation, locating the free block is considered to be a physical I/O operation. Thus, in the conventional scenario without grouping, the n separate inserts translate into n separate physical I/O operations. Conversely, in the grouped execution scenario, the n separate inserts translate into just 1 physical I/O operation. Likewise, the n CAS instructions of the conventional scenario can be replaced with 1 CAS instruction in the grouped execution scenario.

Furthermore, the B+ Tree index gets a smaller disk footprint and hence a reduced cache footprint under the grouped execution scenario.

In general, full table scans will require fewer physical I/O operations when there is a grouped execution. Likewise, any scans going through the complete index can take advantage of grouped execution, as it will typically result in a reduction of physical I/O operations.

A method for concurrent information processing in a server on a multi-core processor environment, in which multiple classes of requests are executed simultaneously, according to one exemplary embodiment, is disclosed. The method comprises: receiving a plurality of requests from a plurality of sessions; identifying a common operation in at least two of the requests, the common operation being an insert operation; grouping the requests having the common operation into one grouped request; and executing the grouped request. Execution of the grouped request comprises: in a single search operation, finding free space in a data store for the data corresponding to each of the requests in the grouped request and, in a single write operation, writing the data in the free space of the data store.

In one exemplary embodiment, the executing the grouped request further comprises: in a single read operation, obtaining a sequence value for the data corresponding to each of the requests in the grouped request. In one exemplary embodiment, the single read operation includes reading a range of sequence values for the data of the grouped request from a concurrent counter, incrementing the concurrent counter based on a size of the range of sequence values, and executing a single compare-and-swap instruction.

In one exemplary embodiment, the executing the grouped request further comprises: in a single index operation, making an index entry corresponding to the range of sequence values in a sequence based index for the data of the grouped request. In one exemplary embodiment, the sequence based index is a B+ Tree. This concept is applicable to indexes represented by other data structures as well, for example, a T-Tree.

In one exemplary embodiment, the method further comprises: determining if the grouping of the requests having the common operation into the grouped request and the executing of the grouped request would provide efficiency gains over executing the requests individually, and performing the grouping of the requests having the common operation into the grouped request and the executing of the grouped request only if such efficiency gains would be provided.

In one exemplary embodiment, each of the requests is assigned a hash value indicative of its task category and useful for identifying the common operation.

In one exemplary embodiment, the data store is one of a persistent data store and an in-memory data store. In one exemplary embodiment, the data store is a database system. In one exemplary embodiment, the data of the grouped requests are records for insertion into the database system.

In one exemplary embodiment, the server is one of an application server and a database server. In one exemplary embodiment, requests flowing to the server are processed asynchronously.

A system for implementing a concurrency architecture for a server, according to one exemplary embodiment, is disclosed. The system comprises: a computer, and instructions embodied on a tangible medium and readable by the computer, wherein the computer processes the instructions to perform a method for concurrent information processing in the server on a multi-core processor environment, in which multiple classes of requests are executed simultaneously, such as one of the above-described methods.

Numerous other aspects, advantages and/or features of the general inventive concepts will become more readily apparent from the following detailed description of exemplary embodiments, from the eventual claims, and from the accompanying drawings and related papers being submitted herewith.

BRIEF DESCRIPTION OF THE DRAWINGS

The general inventive concepts as well as embodiments and advantages thereof are described below in greater detail, by way of example, with reference to the drawings in which.

DETAILED DESCRIPTION

Figure 1:
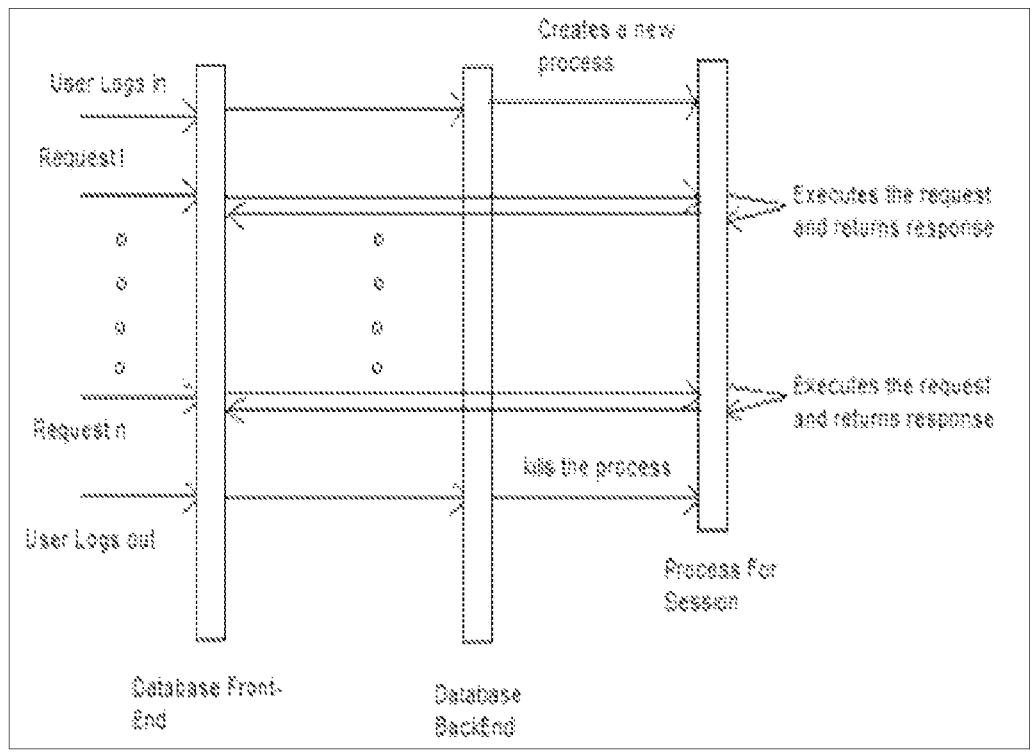
FIG. 1 is a diagram illustrating a conventional process/thread per session architecture.
Figure 2:
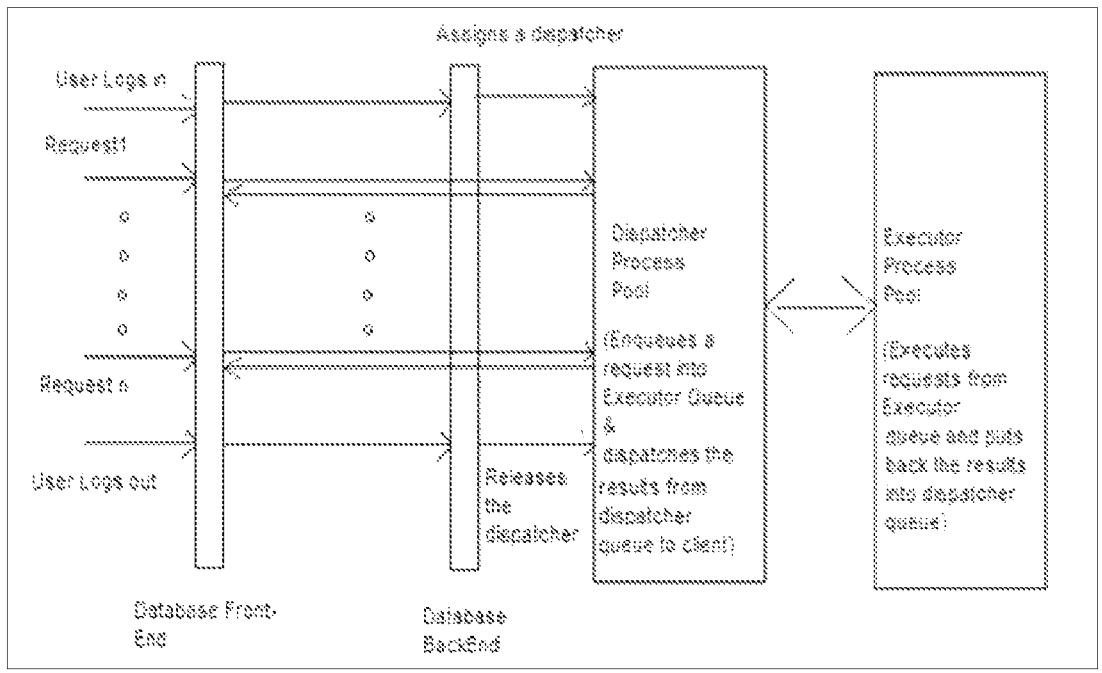
FIG. 2 is a diagram illustrating a conventional process/thread pool architecture for servicing multiple user sessions.

While the general inventive concepts are susceptible of embodiment in many different forms, there are shown in the drawings and will be described herein in detail specific embodiments thereof with the understanding that the present disclosure is to be considered as an exemplification of the principles of the general inventive concepts. Accordingly, the general inventive concepts are not intended to be limited to the specific embodiments illustrated herein.

The following includes definitions of exemplary terms used throughout the disclosure. Both singular and plural forms of all terms fall within each meaning.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing unit" as used herein includes, but is not limited to, any programmed or programmable electronic device that can store, retrieve, and process data.

"Server software," "server program," or simply "server," as used herein, includes but is not limited to a software system which is run (either as an application server or database server or both) to provide services to users or other computer programs, rather than a computer or hardware server (e.g., "blade server," "rack-mounted server") unless it is so understood in context.

"Concurrent processing" or "concurrency," as used herein, includes but is not limited to a software environment or architecture for server software in which multiple classes of queries and/or transactions are executable or executed simultaneously.

"Request," as used herein, includes but is not limited to a command, instruction, transaction, or query from a user or other computer program to the server.

"Request Handler," as used herein, includes but is not limited to a process or thread that executes a request. Whenever a page needs to be locked, the Request Handler acquires the lock so that the request need not be concerned about locks. Request Handlers are combined into Handler groups and a mapping gets created between the database tables and the Handler groups that favors ccNUMA systems. Whenever there is an I/O to be performed in the request, it is forwarded to the I/O Handler, i.e., the thread that does the I/O.

"I/O Handler," as used herein, includes but is not limited to a process or thread that takes care of the I/O portion of any request. The I/O Handler is expected to occupy the processor for very short periods of time to initiate an I/O, leaving the bulk of the processor time available to the Request Handler. Since the I/O service time is usually in milli-seconds and current processors are working in GHz, a worst case thread switching frequency would be approximately 106:1. Usually there is an I/O Handler for each Request Handler, to take care of its I/O Requests.

"Session," as used herein, includes but is not limited to a memory area facilitating execution of requests from one user. Sessions are created when the user logs in. This might end up creating a process/thread in certain architectures. It also serves the purpose of security, in which after the user provides valid login information (e.g., a valid user ID and password), a session is created with a session ID and is used for further communication with the server. A session also encompasses a process or situation whereby a plurality of requests are grouped to facilitate execution thereof in the same context.

Figure 5:
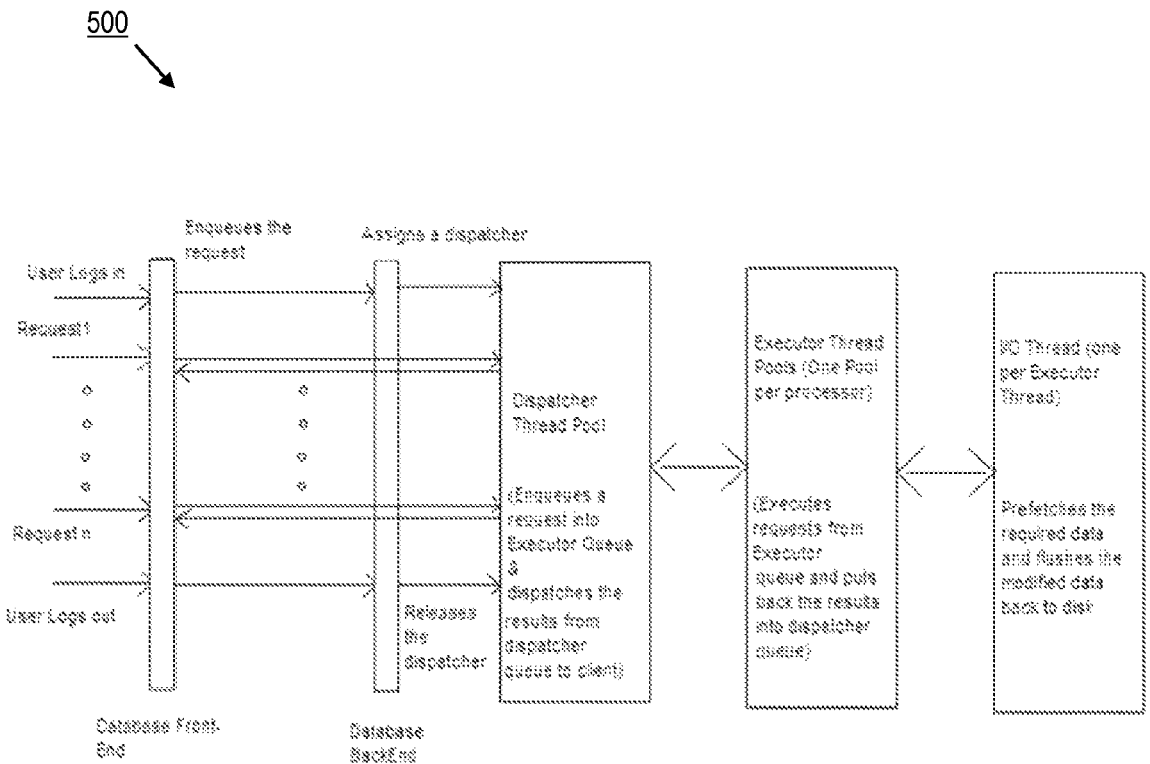
FIG. 5 is a diagram illustrating a server architecture, according to one exemplary embodiment, for concurrently processing requests at a database server.
Figure 6:
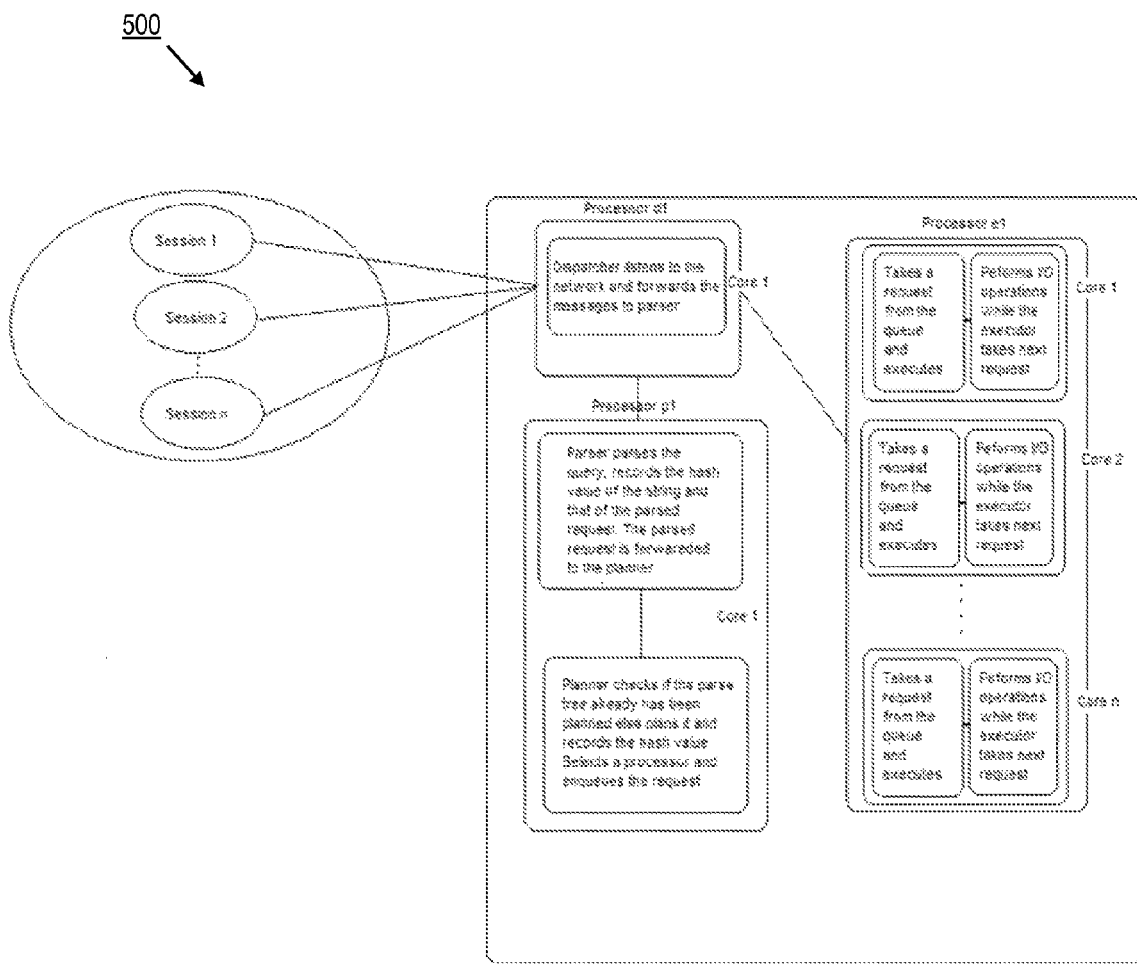
FIG. 6 is a diagram illustrating a server architecture, according to one exemplary embodiment, wherein a plurality of sessions are handled by a process/thread pool in a multi-core processor environment.

With reference to FIGS. 5 and 6, an exemplary server architecture 500 for concurrent information processing in a server system on a multi-core processor caching environment will be described. The information processing includes simultaneous processing of requests comprising multiple classes of queries and/or executing transactions in at least one of an application server and a database server.

Underlying the architecture 500 is the ability to make requests in a substantially asynchronous manner (e.g., a fully asynchronous manner), including the ability to pause and restart a request on demand. This may include modifications of the conventional Half-Sync/Half-Async pattern applicable for databases and application servers such that there is no synchronous part in the execution of a query. It should be noted, nevertheless, that the architecture 500 will work with a substantially asynchronous manner of processing such as where large objects, e.g., multimedia files, are stored and accessed in which case the fully asynchronous manner is not possible or is otherwise undesirable.

In handling large objects, the I/O Handler may not be able to load the object completely into memory in order for the Request Handler to process it. For example, if a size of a large object is 10 GB, then loading it completely might not be feasible in a system with only 8 GB of memory. It may even turn out to be counter-productive, as any attempt to load it would flush out other frequently accessed pages already loaded in the memory. Hence, streaming the large objects synchronously (with possible I/O waits) by the Request Handler is a possible solution for reading them. Nevertheless, the new architecture will work under such circumstances in a substantially asynchronous manner, i.e., by first prefetching a considerable portion (e.g., 100 kb) from the beginning of the object with the I/O Handler. By the time this portion (i.e., the first 100 kb) is finished processing, subsequent portions of the file (e.g., other 100 kb portions) can get loaded because of the prefetching mechanisms employed such as that in a typical file streaming operation by the operating system and hardware processor.

One exemplary method comprises: (a) making the requests in a substantially asynchronous manner, such as in a fully asynchronous manner; (b) calculating a hash value on the request query's string with information to enable similar requests to be grouped together; (c) grouping the similar requests in a group session (whereby a group session is formed by putting all the requests with the same hash value inside a session object); and (d) executing the requests in the group session.

Current database/application server architectures do not support the grouped execution disclosed herein. Due to the general inventive concepts introduced herein, the architecture 500 is substantially asynchronous and preferably a fully asynchronous architecture with no synchronous tasks. In contrast, the conventional Half-Sync/Half-Async architecture puts the longer running tasks under a sync thread group and the shorter running system tasks (like network I/O) into asynchronous tasks. Thus, it can be said that dynamic grouping based on the business transaction to be executed is not accomplished in the current architectures, leaving aside the static grouping in the Half-Sync/Half-Async pattern. Moreover, the grouping referred to herein involves creating a new request object, which is a collection of user requests that can be grouped. In the Half-Sync/Half-Async architecture, the requests are executed separately even though collected in a queue.

Furthermore, in conventional architectures employing the Half-Sync/Half-Async pattern, the threads and session are de-coupled. Requests from the same session might go to different threads. But each request is associated with a query executing process/thread until the completion of the synchronous part of the request execution, which comprises most of the request. The ability to pause and restart a request cannot be supported by the conventional architectures because, in the conventional architectures, the requests lock the shared resources and pausing them makes the resources unavailable.

In the architecture 500, the resources are held by threads and the requests are totally de-coupled from the threads. Consequently, pausing a request only affects the particular request and has no impact on the shared resources.

In one exemplary embodiment, the architecture 500 includes providing the information or query structure of the requests to be maintained such that a plurality of concurrent requests is identifiable by their respective tasks and grouped according to their similarity of task category. One way to structure the requests is to assign each of them with a hash value which reflects the task similarity of the request. In one exemplary embodiment, a hash value is assigned to the request's query or information structure so that a similar hash value is accorded to a similar category of tasks. In this manner, multiple requests having similar tasks in common may be grouped and executed as a single request in a Grouped Executor session. The Grouped Executor session corresponds to the concept of a session in conventional servers and it is capable of executing a series of requests. In particular, the Grouped Executor session is a session created for executing the grouped requests and is deleted after the execution thereof.

The request is switchable between threads, based on the current holder of the shared data required by the request. Accordingly, the information or query structure of the requests may be managed on the basis of thread-specific storage structures while providing concurrent access to shared data among concurrent data updates. A typical situation involves a single process with a fixed number of threads in different classes. As the requests are grouped as a collection of similar requests, a new request object is created so that it may be seen by the Request Handler as a single request and processed accordingly. The incoming requests may be handled by the Request Handlers and a separate class of threads may be embodied as I/O Handlers, taking care of both the network and/or disk I/O. The Request Handler can keep executing tasks by delegating any I/O to the I/O Handler, thereby reducing performance declines caused by waiting.

The Request Handler count can be decided depending on the number of processing units available and the I/O Handler count can be decided based on the amount of parallelism the data storage can support. In one exemplary embodiment, there is one I/O Handler running for each Request Handler. The I/O Handler may prefetch the data needed for the Request Handler and also takes care of flushing the data created by the Request Handler to the secondary storage.

In one exemplary embodiment, the architecture 500 provides for a plurality of synchronization points for each of the requests in the group prior to their completion. Compared to the disadvantages of the process/thread pool architecture noted above, wherein long queries can hog or otherwise occupy the threads for a long time, the architecture 500 solves this problem by splitting a long request into multiple sync-points and allowing it to be paused and restarted between sync-points. Because of this feature, a long request cannot hog the thread for a long time. By dividing the request into multiple sync-points, a user request can be associated with multiple threads and multiple user requests can be grouped and associated with a single thread. This level of de-coupling avoids a request hogging the thread for a long time and is not present in conventional architectures.

This feature involves taking all the requests in the group to a predetermined sync-point before proceeding therefrom and carrying forward all of the requests to a next sync-point. When the requests are divided into multiple sync-points, there is more opportunity to group the requests. Grouping the requests means, for example, grouping the requests which operate on the same data with different operations. Since all the requests operate on the same data, the request processing is highly cache-efficient.

By way of example, consider a join request between Table A and Table B and another join request between Table A and Table C. Suppose both of these requests involve scanning of Table A first. Making the above two requests with two syncpoints (Sync-point 1: scanning Table A and Sync-point 2: scanning the other table) provides a means to group execute the common Sync-point 1 from both the requests. This feature results in execution that is highly data cache-conscious, since only one copy of the Table A rows or tuples is utilized for the two requests. In conventional architectures, each request will have its own copy of the data from Table A which results in duplication, thereby reducing the cache's ability to store more and different data and thus its efficiency.

In one exemplary embodiment, the architecture 500 provides methods having specific elements or embodiments at each one of the processor level, application server end and database server end. At the microprocessor level, an exemplary method provides for each processor to be bound to a thread group with each core hosting two threads, i.e., one thread for each of the Request and I/O Handlers. The Request and I/O Handlers usually operate on the same data and hence cache thrashing is avoided.

The grouped requests may be maintained as a single grouping session for execution in a database server or application server. For database server requests, this can be based on the query plan that is generated. For application server requests, this can be based on the business transaction that is required to be done. The hash value, previously described, serves to group requests which are similar. Any common tasks of the concurrent requests, if executed by the same thread, exploit the cache to a greater extent.

Data cache consciousness greatly impacts performance in databases, but application servers are not as sensitive. Each thread will own a page (i.e., an operating page) and if any other thread wants to operate on the same page, it will enqueue the request in the operating page queue of the thread holding the page. This makes sure that whenever there is a need to operate on a page simultaneously by multiple requests, the requests are moved to the same thread and hence to the same core. This results in most of the data being operated on from the L1 cache of the same processor.

Multiversion concurrency control (MVCC) is conventionally used to resolve concurrency bottlenecks at the record level but the pages are usually accessed with shared or exclusive locks. There typically exists a buffer/page manager infrastructure in all the databases, from where the user sessions request locks. The lock is provided to the requesting sessions by the buffer manager or the page manager which internally employs one or more common synchronization mechanisms. Such locks provide each user connected to the database with a "snapshot" of the database for that person to work with. Any changes made by a user will not be seen by other users of the database until the transaction has been committed. A process which is waiting for a lock is idle until the lock it is interested in is released.

However, this conventional technique leads to the thundering herd problem when the locks are released. In the architecture 500, the request simply gets switched to the thread carrying the data thus avoiding most of the problems associated with traditional locking. In conventional architectures, suppose request A locks a page with an exclusive lock for an insert/update. If another request tries to lock the same page for shared lock/exclusive lock, it goes into waiting mode. In the architecture 500, threads/Handlers take the lock on pages, and the requests that want to work with the locked page enqueue themselves in the thread's queue. The thread executes them one by one, grouping them as appropriate. This is cache-friendly, since the thread operates on the same page again and again. In addition, requests to operate on the data on the same page also provide an opportunity to increase the cache utilization factor for that page.

In one exemplary embodiment, the architecture 500 provides with respect to the database server end that each thread group operates on a subset of tables depending on the workload on the database and only the join operations access data from other tables. Since each thread group operates on a subset of an entire set of tables, the content from a particular table gets mostly cached at that portion of memory, which is local to that thread group. In ccNUMA architectures, having the required data in local memory means faster memory access. This feature is thus particularly favorable to the ccNUMA systems.

Figure 7:
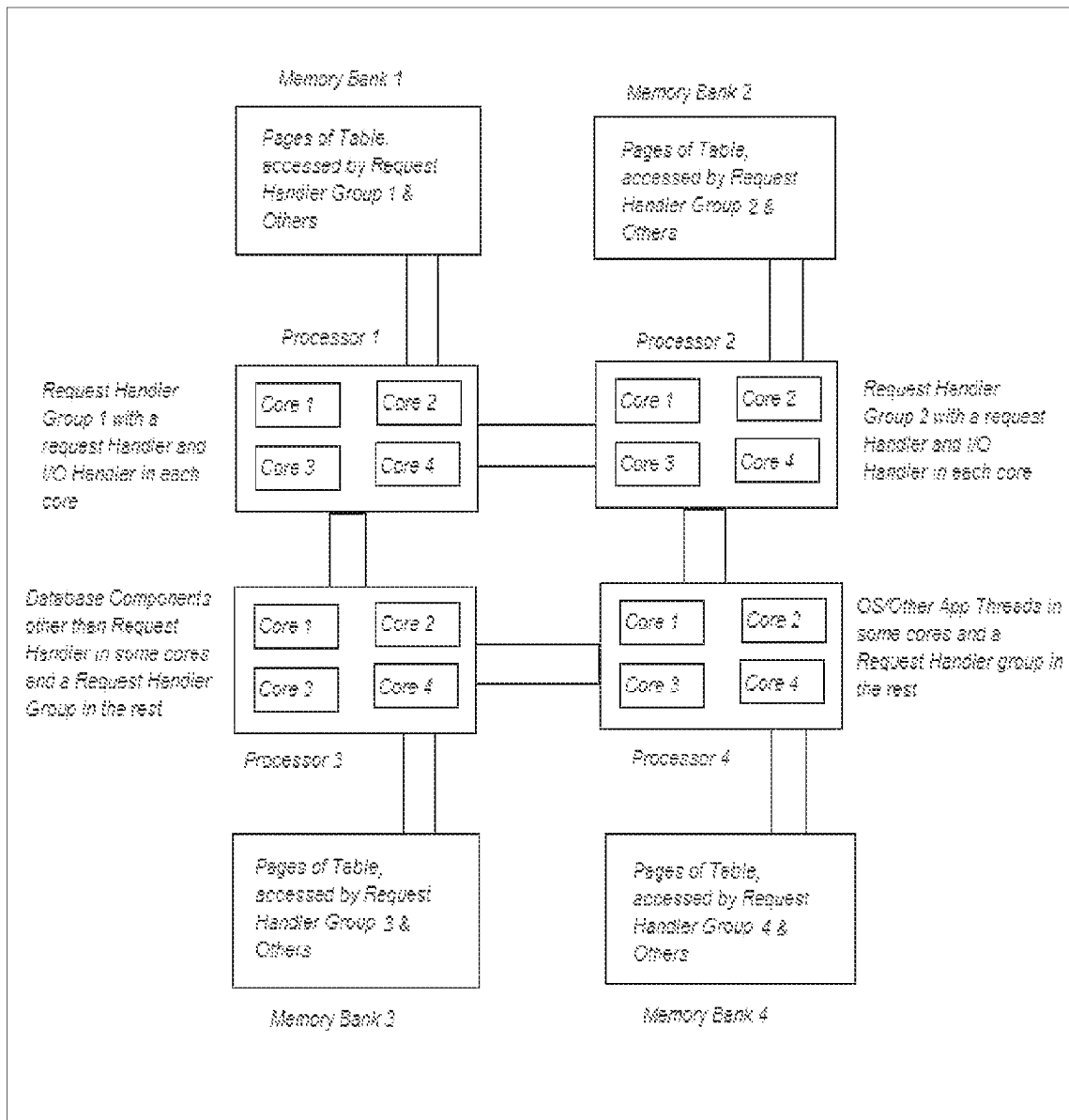
FIG. 7 is a diagram of a Request Handler mapping, according to one exemplary embodiment, which is implementable in an NUMA hardware configuration comprising a quad-processor quad-core system.

By way of example, FIG. 7 shows a diagram of a Request Handler mapping 700 implementable in a typical NUMA hardware configuration which system comprises a quad-processor quad-core system shown to be running different typical tasks distributed over the four processors and their memories. Each of the four quad-core processors shares in its respective Memory Banks the pages of tables that are accessible by a Request Handler Group of the respective processor as well as those of other processors. Each of the processors may contain some Request Handler and I/O Handler threads of a Request Handler Group. Due to affinity between the tables and the Request Handler Group, the pages to be accessed by a Request Handler are most likely to be found in the local memory of its resident core.

Figure 8:
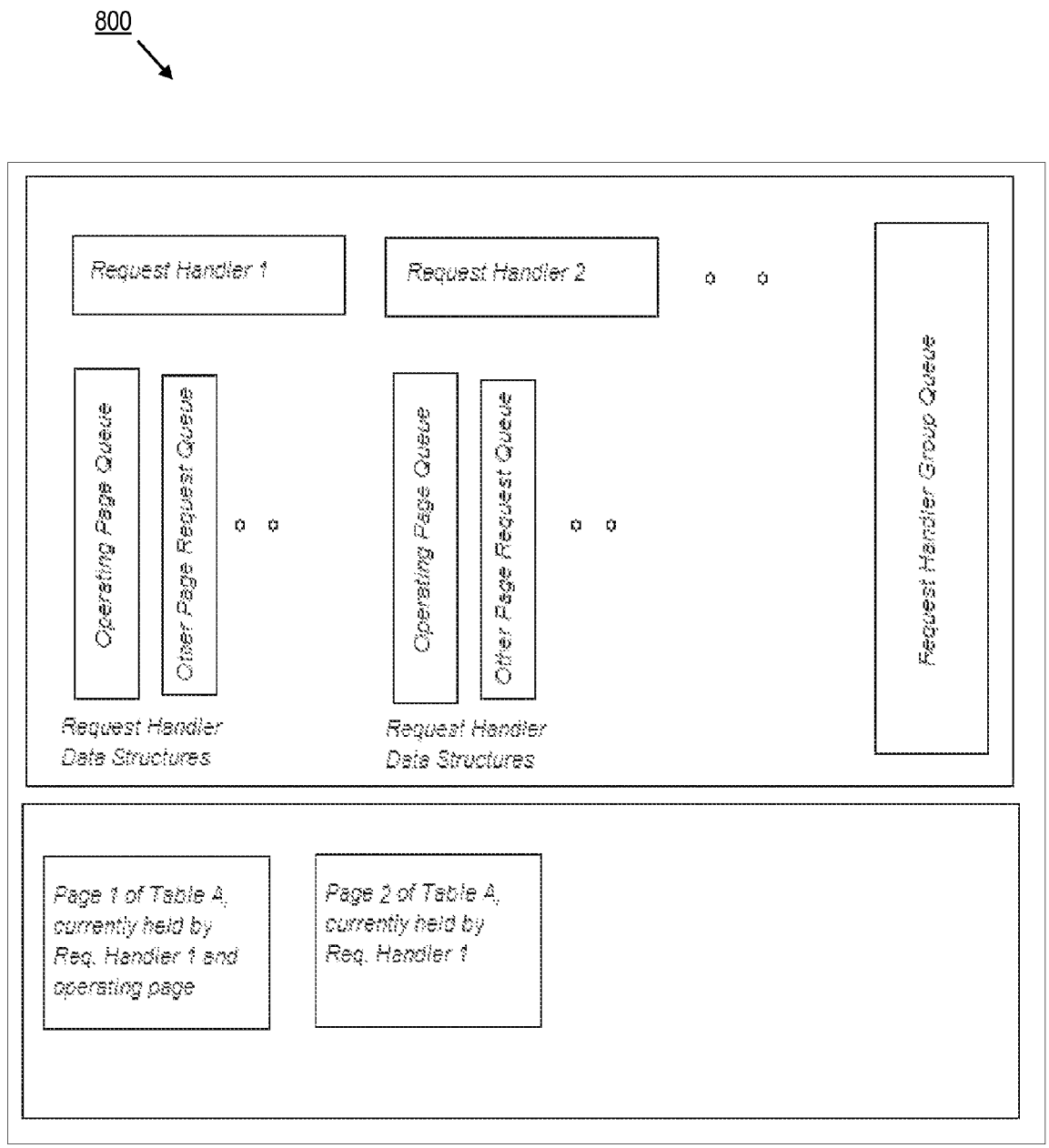
FIG. 8 is a diagram illustrating an exemplary page locking data flow for enabling the enqueuing and execution of requests.

FIG. 8 shows a diagram 800 of an exemplary page locking flow enabling the enqueuing and execution of requests in the architecture (e.g., the architecture 500). A plurality of Request Handlers may operate in series although the diagram 800 only shows the first two Request Handlers. Each Request Handler will take a request from the Request Handler Group Queue to examine it with a view to execute it. If the request's execution requires access to data or information that is on a particular page of a table, then the header of that page is first examined.

If the particular page is already in possession of another Request Handler, say Request Handler 1, then the request is queued under one of the queues of the Request Handler 1, depending on the nature of the page. If the page is marked as the operating page, then the request is queued under the "operating page queue" of the Request Handler 1. Otherwise, it is queued under the "other page request queue." It should be noted that there can only be one operating page per Request Handler, i.e., the page that is currently being acted upon by the Request Handler.

Continuing with the above example, amongst the requests enqueued in the Request Handler Group Queue, suppose Request A is picked up by the Request Handler 2 in its attempt to execute it. In the attempt, it is found that Request A is a request for update of page 1 of Table A. The Request Handler 2 would then proceed to examine the header of the page of interest to find out that it may be found in the operating page of the Request Handler 1. To proceed, the architecture (e.g., the architecture 500) calls for the Request Handler 2 to enqueue Request A under the operating page queue of the Request Handler 1 and then to pick up the next request from the Request Handler Group Queue and continue with its execution.

Advantages of the inventive architecture (e.g., the architecture 500) for concurrently processing information in a server system on a multi-core processor environment may include but are not limited to the following.

The I/O handler takes a count of pages processed from each request and increments it before doing an I/O on its behalf. This helps insure that a request cannot hog or otherwise occupy the thread for an extended period of time. So, once a request gets executed for x pages, it should be forcibly put into sleep mode to avoid hogging the CPU. Instead, the task gets re-queued behind the newly queued requests. This stops a request from repeatedly occupying the CPU continuously for an extended period of time.

The threads and requests are totally de-coupled by virtue of the Total-Async pattern and hence any lock request results in the execution threads taking up another request instead of waiting until the lock is acquired.

Since the threads inside the database process never go into sleep or wait mode as long as there are requests to be served, the system resources are utilized more efficiently.

Furthermore, requests to operate on the data in the same page provide an opportunity to increase the cache utilization factor for that page.

Since I/O is handled by the separate set of threads called I/O Handlers, the Request Handler can keep executing tasks delegating any I/O to the I/O Handler thereby mitigating the performance degradation caused by waiting. The Request Handler count can be decided depending on the number of processing units and the I/O Handler count can be decided based on the amount of parallelism the data storage can support.

Figure 9:
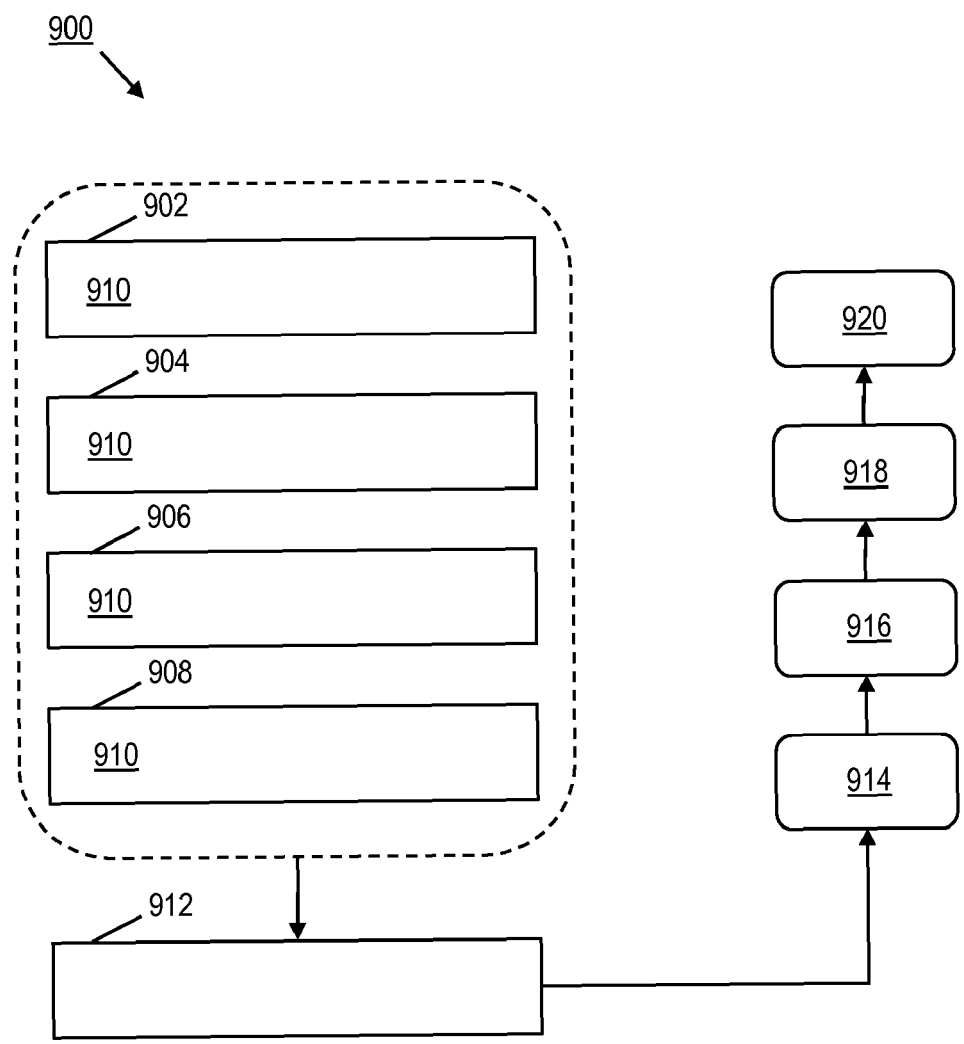
FIG. 9 is a diagram illustrating the grouped execution of multiple requests for database inserts, according to one exemplary embodiment.

In the context of a database server 900 according to one exemplary embodiment, as shown in FIG. 9, n concurrent requests (e.g., from different user sessions) are processed. For example, a first request 902, a second request 904, a third request 906, and a fourth request 908 are processed, such that n equals 4. In one exemplary embodiment, the requests 902, 904, 906, and 908 are portions of requests (e.g., each falling between two adjacent sync-points).

Each of the requests 902, 904, 906, and 908 is a request involving a related database insert. For example, each of the requests 902, 904, 906, and 908 involve an insert for Table A. Accordingly, each of the requests 902, 904, 906, and 908 is assigned a common hash value 910. A query such as "insert into Table A select . . . from Table B" would not fall into this category and, thus, would not be assigned the common hash value 910.

Based on their common hash values 910, the requests 902, 904, 906, and 908 are grouped, as described above, into a new single request 912. The request 912 can form a grouped session. When an executor (e.g., a Request Handler Group) processes the grouped session, it will identify the request 912 as an insert grouping and perform the necessary operations. In particular, the executor will perform an operation 914 to find free space for the collective set of n (i.e., 4) records to be inserted, an operation 916 to write the records into the free space, an operation 918 to obtain a range of n (i.e., 4) sequence values including executing any CAS or similar instruction, and an operation 920 to update an index (e.g., the index 1000) with the range of sequence values.

Thus, unlike in the conventional architectures where 4×n operations are necessary for inserting n records into the database, the architectures according to the general inventive concepts (e.g., the architecture 500) only require (at most) 4×1 operations since the original n requests have been grouped into a single request. In this manner, n is removed as a scaling factor in database insert operations. Indeed, in general, the larger the value of n (i.e., the original number of requests to be grouped) the greater the efficiency gains.

Usually any table in a database is divided into pages with each page having a list of records. In one exemplary embodiment, the free space of pages is tracked in a separate persistent data structure, which is consulted during the operation 914 for getting the free space (e.g., one or more pages having sufficient space) for inserting the n records. An application programming interface (API) acts as an interface to the data structure. In one exemplary embodiment, the API takes the size requested (e.g., in the operation 914) and provides n consecutive pages to satisfy the insert requirement. In one exemplary embodiment, the data structure is a bitmap. The bitmap includes two bits for every page, wherein the bits represent the free space in discrete levels. The bitmap can be scanned through to obtain the required result.

The operation 918 is only performed if there are sequence based fields in the set of records. Typically, the sequence values are generated by some form of concurrent counter. The concurrent counter will usually execute a compare-and-swap (CAS) or similar instruction if multiple threads request a sequence value. In the case of grouped execution for a grouping of n inserts, as described above, instead of executing n individual CAS instructions as occurs in the conventional architectures, the operation 918 obtains a range of n sequence values from the concurrent counter and only performs a single CAS or similar instruction.

The operation 920 is only performed if there is an index on the sequence based fields. Because the collective set of n records are inserted in the table in ascending order relative to the range of sequence values obtained in operation 918, a single index entry can be added to the index to point to the first of the n records inserted in the table wherein the index entry also indicates that n−1 contiguous sequence values follow. In this manner, a single index update occurs in operation 920 for the group of n inserted records.

Figure 3:
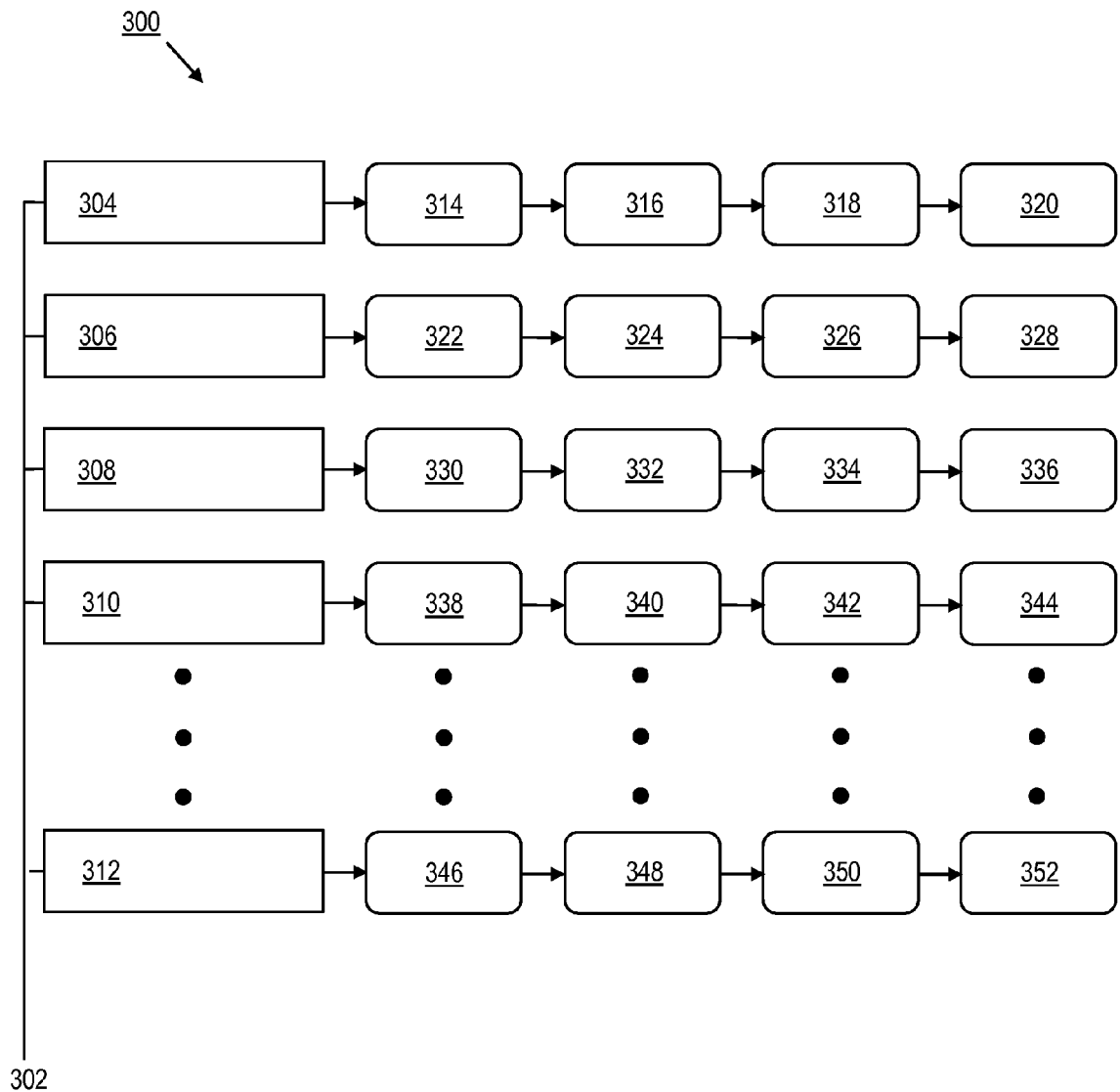
FIG. 3 is a diagram illustrating the conventional separate execution of multiple requests for database inserts.
Figure 4:
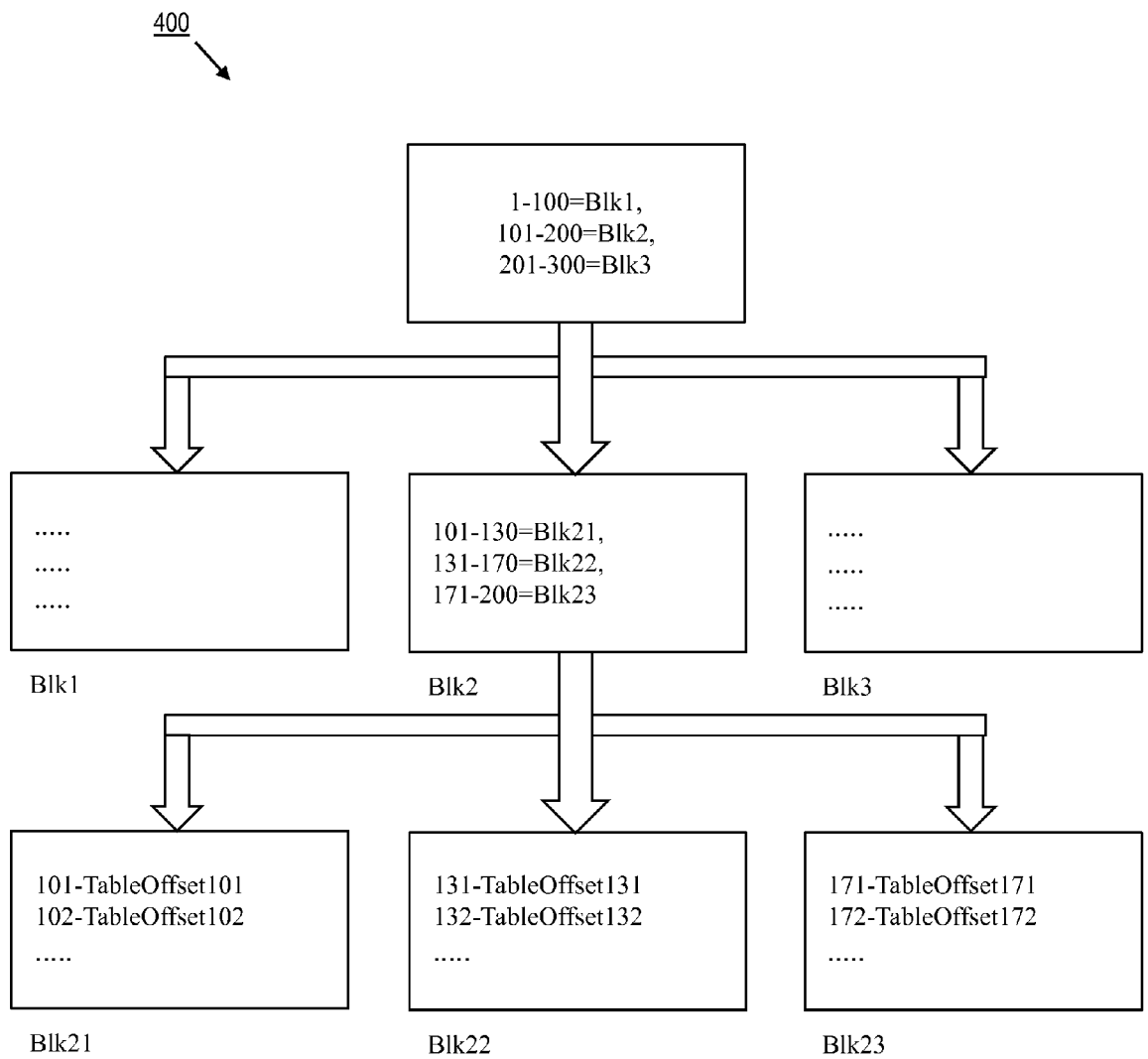
FIG. 4 is a diagram illustrating a structure of a conventional B+ Tree index.
Figure 10:
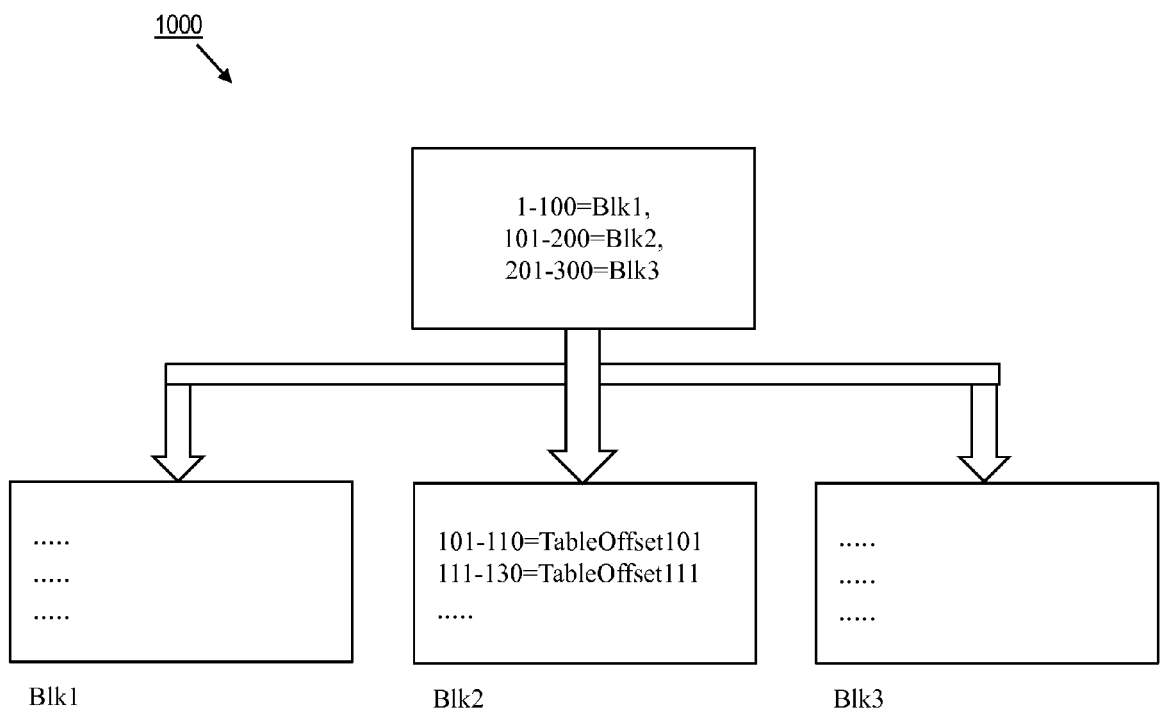
FIG. 10 is a diagram illustrating a structure of a condensed B+ Tree index, according to one exemplary embodiment.

An exemplary index is a B+ Tree index 1000, as shown in FIG. 10. B+ Tree indexes on sequence values are common as such values often constitute the primary keys of a table. As noted above, a single update to the index 1000 occurs during grouped execution of a collective set of n database inserts, instead of performing n individual index updates as occurs in the conventional architectures. Accordingly, the B+ Tree index 1000 is a condensed index having a smaller size footprint than conventional B+ Tree indexes (e.g., the conventional B+ Tree index 300 of FIG. 3).

In some instances, grouped execution of database insert commands does not yield sufficient gains (e.g., improvements in efficiency) so as to be warranted. Thus, when the costs of grouping do not outweigh any gains therefrom, there is no use in performing the grouping and subsequent grouped execution. For example, one scenario in which grouped execution is not performed is for a normal index scan which walks down a B+ Tree index, unless the values being searched are very close to one another and are likely to be placed in the same leaf page.

Accordingly, in one exemplary embodiment of the architecture of the present invention (e.g., the architecture 500), the requests are first evaluated to determine if grouped execution thereof is warranted before any grouping occurs. If it is determined that the costs of performing the grouped execution of the database insert commands are outweighed by the likely gains resulting therefrom, then grouped execution occurs and overall efficiency is expected to increase. Otherwise, grouped execution does not take place.

The above description of specific embodiments has been given by way of example. From the disclosure given, those skilled in the art will not only understand the general inventive concepts and their attendant advantages, but will also find apparent various changes and modifications to the systems and methods disclosed. It is sought, therefore, to cover all such changes and modifications as fall within the spirit and scope of the general inventive concepts, as described and claimed herein, and any equivalents thereof.

The invention claimed is:

1. A method for concurrent information processing in a server on a multi-core processor environment, in which multiple classes of requests are executed simultaneously, the method comprising:
   receiving a plurality of requests from a plurality of sessions;
   decomposing each request into a plurality of syncpoints, wherein a thread executing the request can be paused and restarted between two syncpoints;
   processing each request from syncpoint to syncpoint to identify a common operation in at least two of the requests, the common operation comprising an insert operation;
   grouping the requests having the common operation into one grouped request; and
   executing the grouped request, wherein executing the grouped request comprises:
      in a single search operation, finding free space in a data store for data corresponding to each of the requests in the grouped request, and
      in a single write operation, writing the data in the free space of the data store.

2. The method of claim 1, wherein executing the grouped request further comprises: in a single read operation, obtaining a sequence value for the data corresponding to each of the requests in the grouped request.

3. The method of claim 2, wherein the single read operation includes reading a range of sequence values for the data of the grouped request from a concurrent counter, incrementing the concurrent counter based on a size of the range of sequence values, and executing a single compare-and-swap instruction.

4. The method of claim 3, wherein executing the grouped request further comprises: in a single index operation, making an index entry corresponding to the range of sequence values in a sequence based index for the data of the grouped request.

5. The method of claim 4, wherein the sequence based index is a B+ Tree.

6. The method of claim 1, wherein each of the requests is assigned a hash value indicative of a task category and useful for identifying the common operation.

7. The method of claim 1, wherein the data store is one of a persistent data store and an in-memory data store.

8. The method of claim 1, wherein the data store is a database system.

9. The method of claim 1, wherein the data of the grouped requests are records for insertion into the database system.

10. The method of claim 1, wherein the server is one of an application server and a database server.

11. The method of claim 1, wherein incoming requests are processed asynchronously.

12. The method of claim 1, further comprising:
   determining if the grouping of the requests having the common operation into the grouped request and the executing of the grouped request would provide efficiency gains over executing the requests individually, and
   performing the grouping of the requests having the common operation into the grouped request and the executing of the grouped request only if such efficiency gains would be provided.

13. A system for implementing a concurrency architecture for a server, the system comprising: a computer, and instructions embodied on a tangible medium and readable by the computer, wherein the computer processes the instructions to perform a method for concurrent information processing in the server on a multi-core processor environment, in which multiple classes of requests are executed simultaneously, the method comprising:
   receiving a plurality of requests from a plurality of sessions;
   decomposing each request into a plurality of syncpoints, wherein a thread executing the request can be paused and restarted between two syncpoints;
   processing each request from syncpoint to syncpoint to identify a common operation in at least two of the requests, the common operation comprising an insert operation;
   grouping the requests having the common operation into one grouped request; and
   executing the grouped request, wherein executing the grouped request comprises:
      in a single search operation, finding free space in a data store for data corresponding to each of the requests in the grouped request, and
      in a single write operation, writing the data in the free space of the data store.

14. The system of claim 13, wherein executing the grouped request further comprises: in a single read operation, obtaining a sequence value for the data corresponding to each of the requests in the grouped request.

15. The system of claim 14, wherein the single read operation includes reading a range of sequence values for the data of the grouped request from a concurrent counter, incrementing the concurrent counter based on a size of the range of sequence values, and executing a single compare-and-swap instruction.

16. The system of claim 15, wherein executing the grouped request further comprises: in a single index operation, making an index entry corresponding to the range of sequence values in a sequence based index for the data of the grouped request.

17. The system of claim 16, wherein the sequence based index is one of a B+ Tree and a T-Tree.

18. The system of claim 13, wherein each of the requests is assigned a hash value indicative of a task category and useful for identifying the common operation.

19. The system of claim 13, wherein the data store is one of a persistent data store and an in-memory data store.

20. The system of claim 13, wherein the data store is a database system.

21. The system of claim 13, wherein the data of the grouped requests are records for insertion into the database system.

22. The system of claim 13, wherein the server is one of an application server and a database server.

23. The system of claim 13, wherein incoming concurrent requests are processed asynchronously.

24. The system of claim 13, wherein the method further comprises:
   determining if the grouping of the requests having the common operation into the grouped request and the executing of the grouped request would provide efficiency gains over executing the requests individually, and
   performing the grouping of the requests having the common operation into the grouped request and the executing of the grouped request only if such efficiency gains would be provided.

* * * * *